(12) United States Patent
Pastouchenko et al.

(10) Patent No.: US 10,556,702 B2
(45) Date of Patent: Feb. 11, 2020

(54) AIRCRAFT HAVING AN AIRFLOW DUCT

(71) Applicant: General Electric Company, Schenectady, NY (US)

(72) Inventors: Nikolai N. Pastouchenko, Glenville, NY (US); Jixian Yao, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 406 days.

(21) Appl. No.: 15/208,917

(22) Filed: Jul. 13, 2016

(65) Prior Publication Data
US 2018/0016000 A1 Jan. 18, 2018

(51) Int. Cl.
*B64D 29/04* (2006.01)
*B64C 5/02* (2006.01)

(52) U.S. Cl.
CPC ............... *B64D 29/04* (2013.01); *B64C 5/02* (2013.01)

(58) Field of Classification Search
CPC ............ B64D 29/04; B64D 2033/0226; B64C 21/02; B64C 21/025; B64C 5/02; Y02T 50/166
See application file for complete search history.

(56) References Cited

U.S. PATENT DOCUMENTS

| | | | |
|---|---|---|---|
| 2,477,637 A * | 8/1949 | Mercier | B64C 21/06 244/130 |
| 4,200,252 A | 4/1980 | Logan et al. | |
| 6,527,224 B2 * | 3/2003 | Seidel | B64D 33/02 244/53 A |
| 8,070,092 B2 | 12/2011 | Bouldin et al. | |
| 8,632,031 B2 | 1/2014 | Shmilovich et al. | |
| 8,651,813 B2 | 2/2014 | Long | |
| 9,611,034 B1 * | 4/2017 | Suciu | B64C 21/08 |
| 2008/0149205 A1 | 6/2008 | Gupta et al. | |
| 2013/0306024 A1 | 11/2013 | Rolt | |
| 2015/0330310 A1 * | 11/2015 | deGaribody | G01S 17/58 701/100 |

(Continued)

FOREIGN PATENT DOCUMENTS

FR 2979391 A1 3/2013

OTHER PUBLICATIONS

Charles et al., "Guidelines for Reducing Helicopter Parasite Drag", Journal of the American Helicopter Society, vol. 20, No. 1, pp. 31-40(10), Jan. 1, 1975.

(Continued)

*Primary Examiner* — Valentina Xavier
(74) *Attorney, Agent, or Firm* — Christopher R. Carroll; The Small Patent Law Group LLC

(57) ABSTRACT

An aircraft is provided including a propulsor having a plurality of fan blades. The aircraft additionally includes a fuselage, with the propulsor attached to the fuselage at an aft end of the fuselage. A stabilizer extends away from the fuselage proximate the aft end, the stabilizer including a portion positioned upstream of the plurality of fan blades. The aircraft additionally includes an airflow duct extending between an inlet and an outlet. The inlet is positioned to receive an airflow from a location outside the fuselage of the aircraft. The outlet is positioned to exhaust the airflow to at least partially offset a wake upstream of the plurality of fan blades, the wake generated by the stabilizer during operation of the aircraft.

18 Claims, 7 Drawing Sheets

(56) References Cited

U.S. PATENT DOCUMENTS

2016/0122005 A1\* 5/2016 Florea .................... B64C 21/04
                                                              244/53 B
2018/0057150 A1\* 3/2018 Cheung .................. B64C 21/08
2018/0208297 A1\* 7/2018 Ramakrishnan ........ B64C 21/06

OTHER PUBLICATIONS

Seitz et al., "Conceptual investigation of a propulsive fuselage aircraft layout", Aircraft Engineering and Aerospace Technology, vol. 86, Issue: 6, pp. 464-472, 2014.

\* cited by examiner

… (1)

AIRCRAFT HAVING AN AIRFLOW DUCT

FIELD OF THE INVENTION

The present subject matter relates generally to an aircraft having features for providing a consistent velocity profile to a propulsor of the aircraft.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft. Positioning a fan at an aft end of the fuselage of the aircraft may assist with reducing an overall drag on the aircraft by reenergizing a boundary layer airflow over the aft end of the fuselage. However, given existing structures at the aft end of the fuselage, such as one or more stabilizers, the airflow ingested by such a fan may not have a consistent velocity profile along the circumferential direction of the fan. More specifically, the structures at the aft end of the fuselage may generate a wake resulting in an inconsistent velocity profile of the airflow ingested by the fan along the circumferential direction.

Accordingly, an aircraft including features for preventing an airflow ingested by the fan at the aft end of the fuselage having an inconsistent velocity profile would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft is provided. The aircraft includes a propulsor including a plurality of fan blades. The aircraft also includes a fuselage extending between a forward end and an aft end, the propulsor attached to the fuselage at the aft end of the fuselage. The aircraft also includes a stabilizer extending away from the fuselage proximate the aft end of the fuselage, the stabilizer including at least a portion positioned upstream from the plurality of fan blades. The aircraft also includes an airflow duct extending between an inlet and an outlet, the inlet positioned to receive an airflow from a location outside the fuselage of the aircraft, the outlet positioned to exhaust the airflow to at least partially offset a wake upstream of the plurality of fan blades of the propulsor, the wake generated by the stabilizer during operation of the aircraft.

In an exemplary aspect of the present disclosure, a method is provided for operating a propulsor of an aircraft having a plurality of fan blades. The aircraft includes a fuselage defining an aft end, a stabilizer positioned proximate the aft end of the fuselage, and an airflow duct extending between an inlet and an outlet. The method includes receiving an airflow from a location outside the fuselage of the aircraft through the inlet of the airflow duct. The method also includes providing the airflow received through the inlet of the airflow duct through the outlet of the airflow duct to a location upstream of the plurality of fan blades of the propulsor to at least partially offset a wake generated upstream of the plurality of fan blades of the propulsor by the stabilizer during operation of the aircraft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
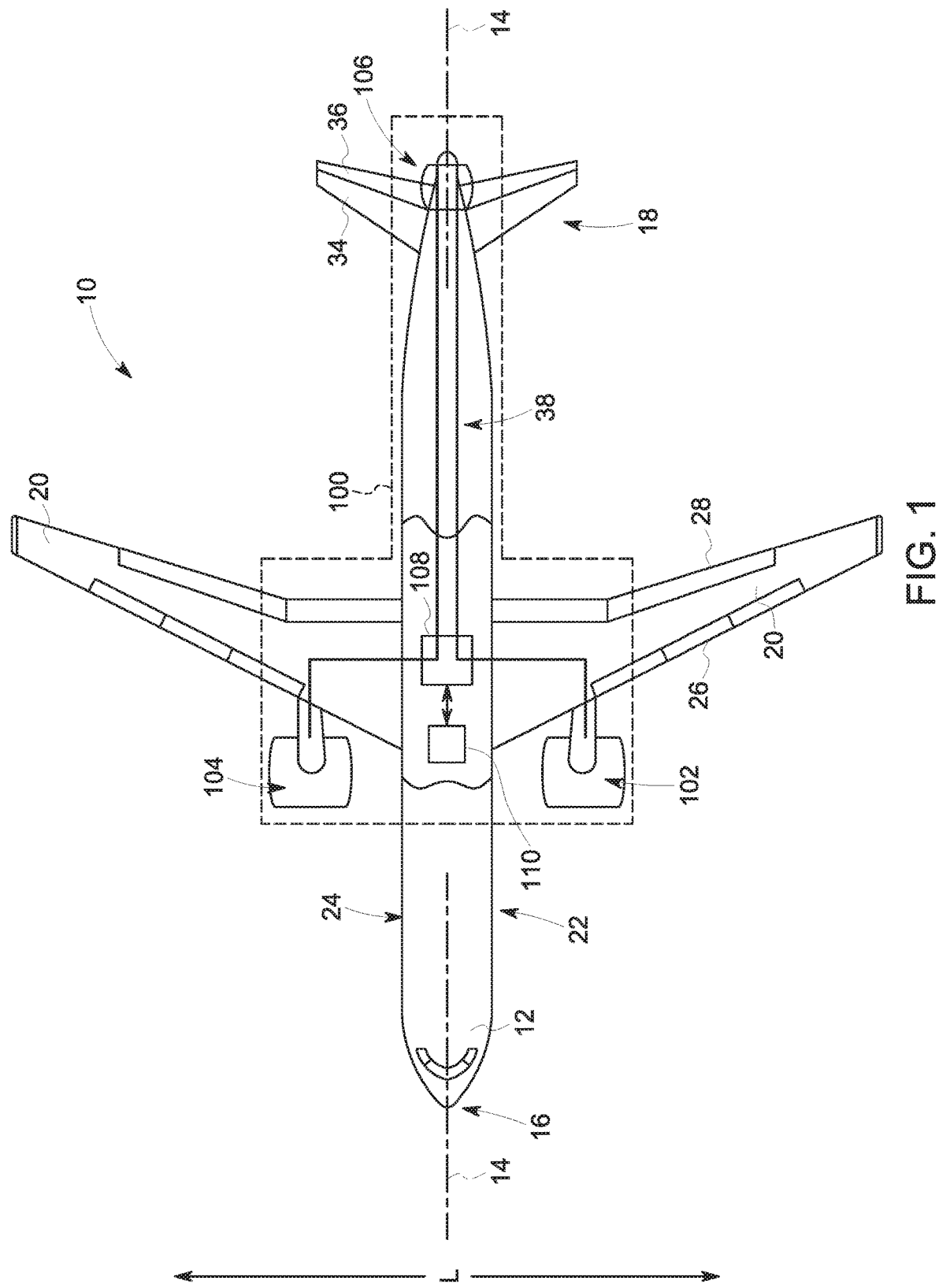
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. Additionally, the terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure generally provides for an aircraft having a propulsor, the propulsor having a plurality of fan blades. The aircraft additionally includes a fuselage extending between a forward end and an aft end, with the propulsor attached the fuselage at the aft end. Accordingly, in certain embodiments the propulsor may more particularly be an aft fan, and more particularly still, a boundary layer ingestion, aft fan. A stabilizer of the aircraft extends away from the fuselage proximate the aft end of the fuselage and includes at least a portion positioned upstream from the plurality of fan blades. During operation of the aircraft, or rather, during flight, the stabilizer may generate a wake immediately downstream of the stabilizer, reducing a local velocity of an airflow ingested by the propulsor during such operating conditions. Accordingly, the exemplary aircraft further includes an airflow duct extending between an inlet and an outlet. The inlet is positioned to receive an airflow from a location outside of the fuselage of the aircraft. The outlet is positioned to exhaust the airflow to at least partially offset the wake upstream of the plurality of fan blades of the propulsor generated by the stabilizer. An aircraft having the above features may provide for a substantially consistent velocity profile of the airflow ingested by an aft fan of the aircraft along a circumferential direction.

Figure 2:
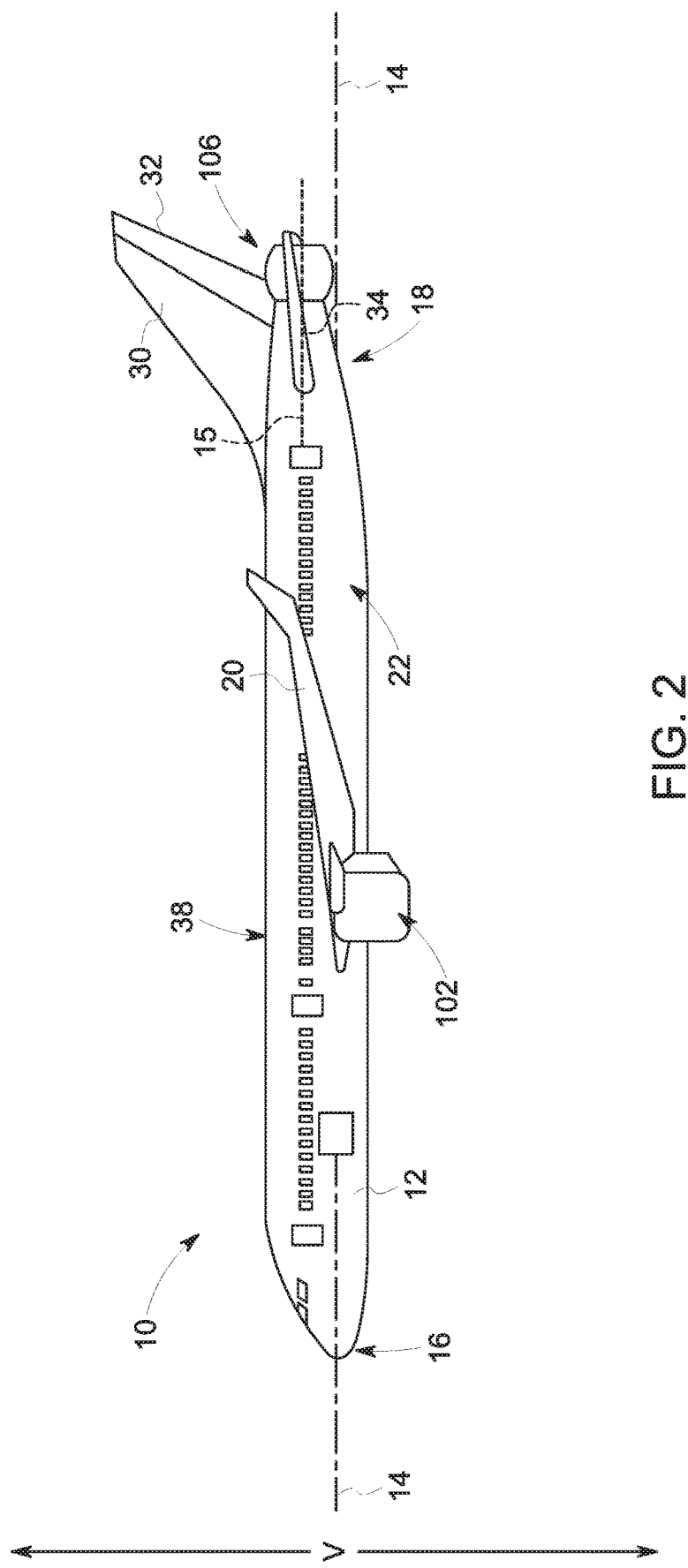
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, and a lateral direction L. Moreover, the aircraft 10 includes a fuselage 12 extending longitudinally between a forward end 16 and an aft end 18. The aircraft 10 further defines a mean line 15 extending between the forward end 16 and aft end 18 of the fuselage 12. As used herein, the term "fuselage" generally includes all of the body of the aircraft 10, such as an empennage of the aircraft 10. Additionally, as used herein, the "mean line" refers to a midpoint line extending along a length of the aircraft 10, not taking into account the appendages of the aircraft 10 (such as the wings 20 and stabilizers discussed below).

Moreover, the aircraft 10 further includes a pair of wings 20. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes a pair of aircraft engines, at least one of which mounted to each of the pair of wings 20, and an aft engine. For the embodiment depicted, the aircraft engines are configured as turbofan jet engines 102, 104 suspended beneath the wings 20 in an under-wing configuration. Additionally, the aft engine is configured as a fan configured to ingest and consume air forming a boundary layer over the fuselage 12 of the aircraft 10. Specifically, for the embodiment depicted, the aft engine is configured as an aft, boundary layer ingestion (BLI) fan ("aft fan 106"), configured to ingest and consume air forming a boundary layer over the fuselage 12 of the aircraft 10. The aft fan 106 is mounted to the fuselage 12 at a location aft of the wings 20 and/or the jet engines 102, 104, such that the mean line 15 extends therethrough. Specifically, for the embodiment depicted, the aft fan 106 is fixedly connected to the fuselage 12 at the aft end 18, such that the aft fan 106 is incorporated into or blended with a tail section at the aft end 18. However, it should be appreciated that in various other embodiments, the aft fan 106 may alternatively be positioned at any suitable location of the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or both of the energy storage device 110 or the aft fan 106. Accordingly, in such an embodiment, the propulsion system 100 may be referred to as a gas-electric propulsion system.

Notably, although the electric generator 108 is depicted schematically, separate from the jet engines 102, 104, in certain embodiments, the electric generator may be configured with one of the jet engines 102, 104, or alternatively, the electric generator 108 may include a plurality of electric generators, with each of the jet engines 102, 104 configured with one of the electric generators 108. For example, in certain exemplary embodiments, at least one of the jet engines 102, 104 may be configured as a high bypass, turbofan jet engine with an electric generator driven by one or more shafts of the turbofan jet engine.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, in other embodiments, the propulsion system 100 may include any suitable number or configuration of jet engines (e.g., turbofan, turboprop, turbojet, etc.). Alternatively still, in other embodiments, the propulsion system 100 may not include underwing mounted jet engines, and may instead include any suitable power source (such as an electric power source) for powering the aft fan 106.

Figure 3:
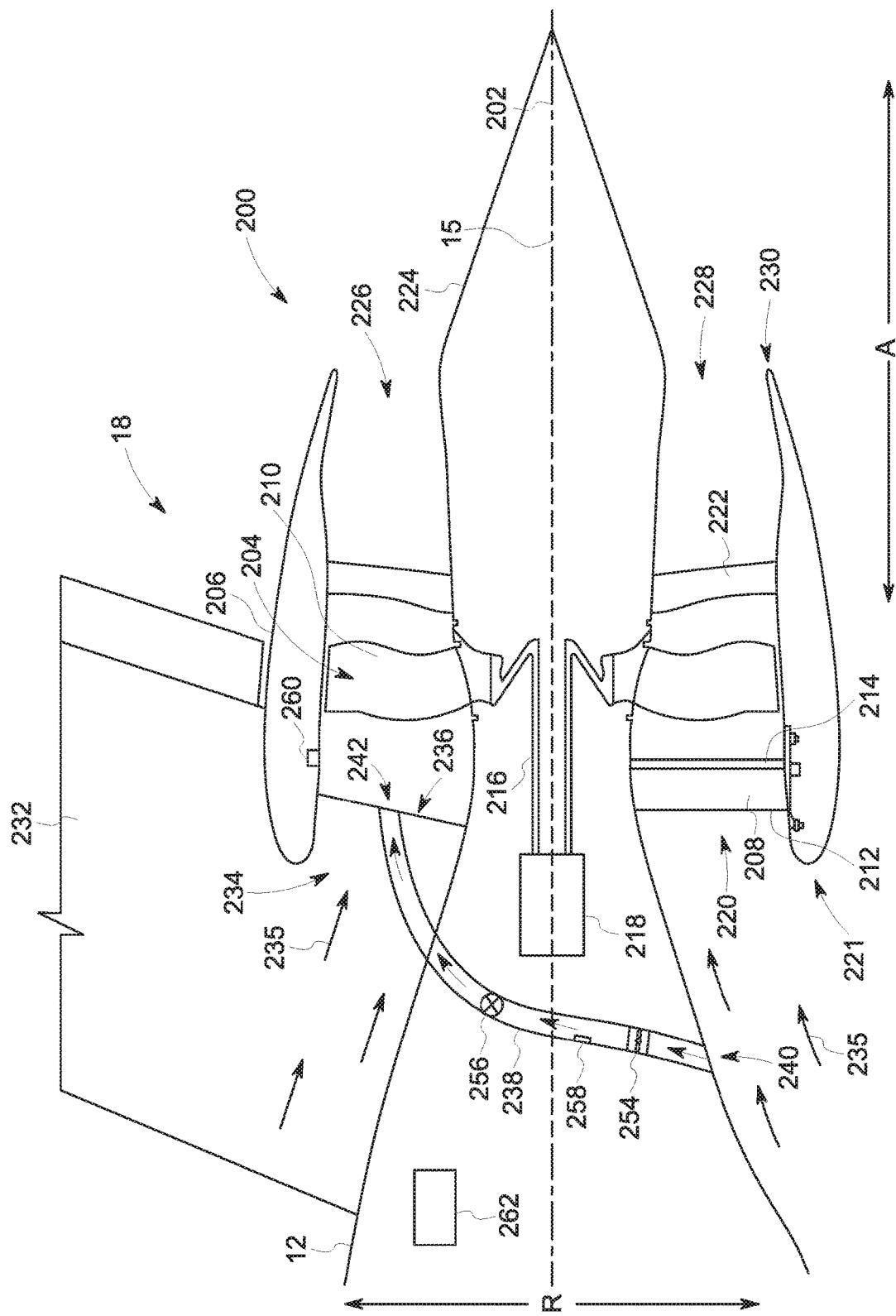
FIG. 3 is a schematic, cross-sectional view of an aft engine in accordance with an exemplary embodiment of the present disclosure.

Referring now to FIG. 3, a schematic, cross-sectional side view of a propulsor in accordance with various embodiments of the present disclosure is provided. The propulsor is, for the embodiment depicted, mounted to an aircraft 10 including a fuselage 12 extending between a forward end 16 and an aft end 18, with the propulsor mounted to the fuselage 12 of the aircraft 10 at the aft end 18 of the fuselage 12. Specifically, for the embodiment depicted, the propulsor is configured as an aft engine, or more particularly, is configured as a boundary layer ingestion (BLI), aft fan 200. The aft fan 200 may be configured in substantially the same manner as the aft fan 106 described above with reference to FIGS. 1 and 2, and the aircraft 10 may be configured in substantially the same manner as the exemplary aircraft 10 described above with reference to FIGS. 1 and 2.

Figure 5:
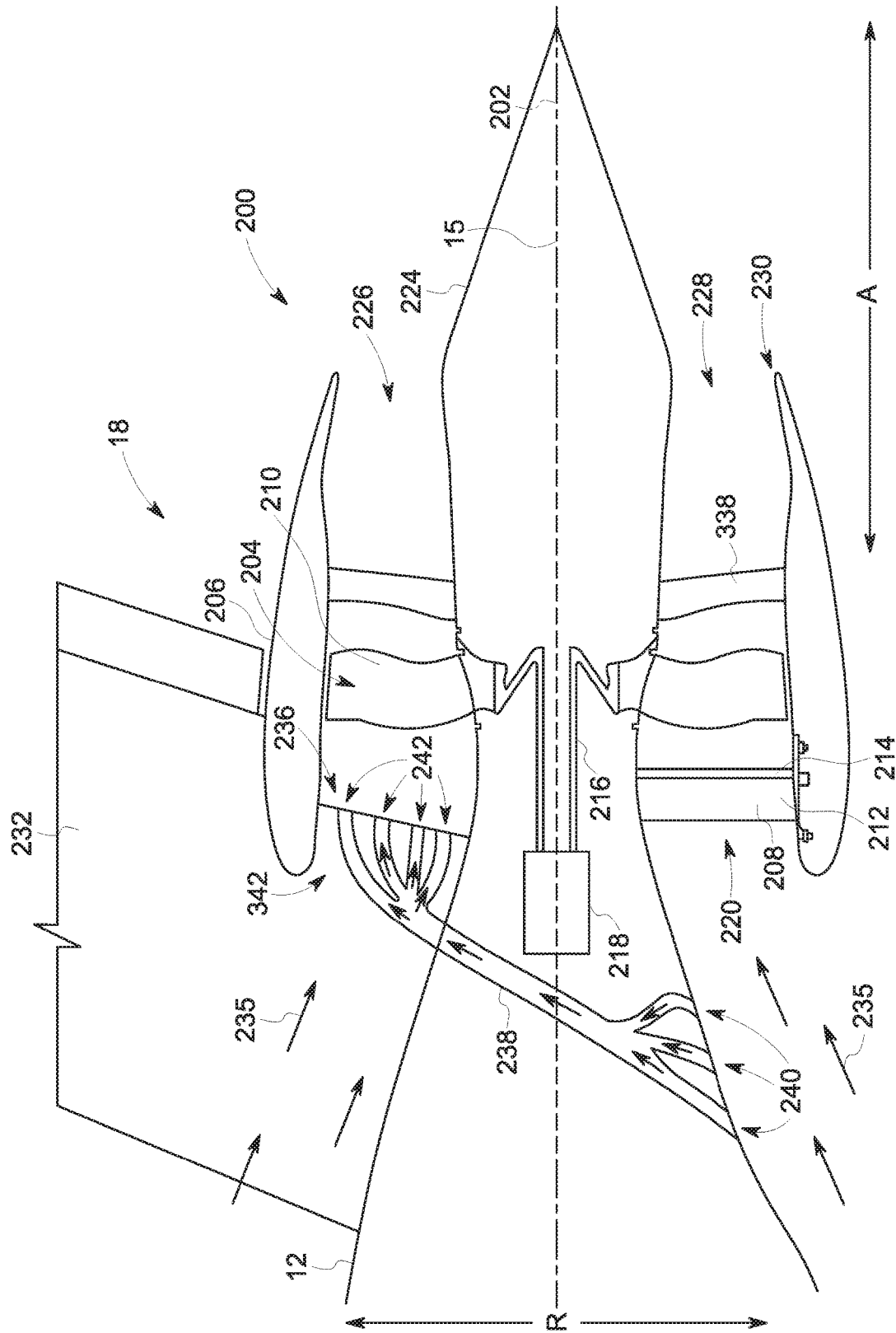
FIG. 5 is a schematic, cross-sectional view of an aft engine in accordance with another exemplary embodiment of the present disclosure.

As shown in FIG. 3, the aft fan 200 defines an axial direction A extending along a longitudinal, axial centerline 202 that extends therethrough for reference. Additionally, the aft fan 200 defines a radial direction R and a circumferential direction C (see FIG. 5).

In general, the aft fan 200 includes a fan 204 rotatable about the axial centerline 202, an outer nacelle 206 extending around a portion of the fan 204, and one or more structural members 208 extending between the nacelle 206 and the fuselage 12 of the aircraft 10. More specifically, the fan 204 includes a plurality of fan blades 210 spaced generally along the circumferential direction C (see FIG. 5), and the one or more structural members 208 extend between the nacelle 206 and the fuselage 12 of the aircraft 10 at a location forward of the plurality of fan blades 210, for mounting the aft fan 200 to the aircraft 10. The one or more structural members 208 for the embodiment depicted extend substantially along the radial direction R of the aft fan 200 between the nacelle 206 and the fuselage 12 of the aircraft 10 for mounting the aft fan 200 to the fuselage 12 of the aircraft 10. It should be appreciated, that as used herein, terms of approximation, such as "approximately," "substantially," or "about," refer to being within a ten percent margin of error/variation.

Additionally, for the embodiment depicted, the one or more structural members 208 are configured as inlet guide vanes for the fan 204. Specifically, the one or more structural members 208 are shaped and oriented to direct and condition a flow of air into the aft fan 200 to, e.g., increase an efficiency of the aft fan 200, or reduce a distortion of the air flowing into the aft fan 200.

In certain exemplary embodiments, the one or more structural members 208 may be configured as fixed inlet guide vanes extending between the nacelle 206 and the fuselage 12 of the aircraft 10. However, for the embodiment depicted, the one or more structural members 208 are configured as variable inlet guide vanes. More specifically, the structural member 308 extends between a forward, upstream end and an aft, downstream end. A body 212 of the structural member 308 depicted is fixed relative to the nacelle 206 of the aft fan 200 and the fuselage 12 of the aircraft 10. However, the structural member 308 additionally includes a flap 214 at the aft end configured to rotate about a substantially radial axis (not labeled). Specifically, as shown, the flap 214 is configured to rotate between various positions, such that the structural member 308 may vary a direction in which air flowing thereover is directed.

Referring still to FIG. 3, the nacelle 206 extends around and encircles the plurality of fan blades 210, and also extends around the fuselage 12 of the aircraft 10, the mean line 15 of the aircraft 10, and the axial centerline 202 when, as in FIG. 3, the aft fan 200 is mounted to the aircraft 10. Notably, as used herein, the term "nacelle" includes the nacelle as well as any structural fan casing.

As is also depicted in FIG. 3, the fan 204 additionally includes a fan shaft 216 with the plurality of fan blades 210 attached thereto. Although not depicted, the fan shaft 216 may be rotatably supported by one or more bearings located forward of the plurality of fan blades 210 and, optionally, by one or more bearings located aft of the plurality of fan blades 210. Such bearings may be any suitable one of, or combination of, roller bearings, ball bearings, thrust bearings, gas bearings, etc.

In certain exemplary embodiments, the plurality of fan blades 210 may be attached in a fixed manner to the fan shaft 216, or alternatively, the plurality of fan blades 210 may be rotatably attached to the fan shaft 216. For example, the plurality of fan blades 210 may be attached to the fan shaft 216 such that a pitch of each of the plurality of fan blades 210 may be changed, e.g., in unison, by a pitch change mechanism (not shown). Changing the pitch of the plurality of fan blades 210 may increase an efficiency of the aft fan 200 and/or may allow the aft fan 200 to achieve a desired thrust profile. With such an exemplary embodiment, the aft fan 200 may be referred to as a variable pitch aft fan 200.

The fan shaft 216 is mechanically coupled to a power source 218 located at least partially within the fuselage 12 of the aircraft 10, forward of the plurality of fan blades 210. Although not depicted, in certain exemplary embodiments the fan shaft 216 may be mechanically coupled to the power source 218 through a gearbox configured to modify a rotational speed of the power source 218, such that the fan 204 of the aft fan 200 rotates at a desired rotational speed.

In certain exemplary embodiments, the aft fan 200 may be configured with a gas-electric propulsion system, such as the gas-electric propulsion system 100 described above with reference to FIG. 1. In such an embodiment, the power source 218 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft 10 engines to electric power. However, in other exemplary embodiments, the power source 218 may instead be any other suitable power source. For example, the power source 218 may alternatively be configured as a gas engine, such as a gas turbine engine or internal combustion engine. Moreover, in certain exemplary embodiments, the power source 218 may be positioned at any other suitable location within, e.g., the fuselage 12 of the aircraft 10 or the aft fan 200. For example, in certain exemplary embodiments, the power source 218 may be configured as a gas turbine engine positioned at least partially within the aft fan 200.

Referring still to FIG. 3, the aft fan 200, or rather the outer nacelle 206 of the aft fan 200, defines an inlet 220 at a forward end between a forward end 220 of the nacelle 206 and the fuselage 12 of the aircraft 10/cowling of the aft fan 200. As mentioned above, the nacelle 206 of the aft fan 200 extends around the mean line 15 of the aircraft 10, around the fuselage 12 of the aircraft 10 at the aft end 18 of the aircraft 10, and around the axial centerline 202. Specifically, for the embodiment depicted, the outer nacelle 206 of the aft fan 200 extends substantially three hundred sixty degrees (360°) around the axial centerline 202 and the fuselage 12 of the aircraft 10 when, such as in the embodiment depicted, the aft fan 200 is mounted to the aircraft 10.

Notably, the exemplary aft fan 200 depicted additionally includes one or more outlet guide vanes 222 and a tail cone 224. The one or more outlet guide vanes 222 for the embodiment depicted extend between the nacelle 206 and the tail cone 224 for directing a flow of air through the aft fan 200, and optionally for adding strength and rigidity to the aft fan 200. The outlet guide vanes 222 may be evenly spaced along the circumferential direction C, or may have any other suitable spacing. Additionally, the outlet guide vanes 222 may be fixed outlet guide vanes, or alternatively may be variable outlet guide vanes. Inclusion of the plurality of outlet guide vanes 222 extending between the nacelle 206 and the tail cone 224 may allow for, e.g., tighter clearances between the plurality of fan blades 210 and the nacelle 206, such that an efficiency of the aft fan 200 may be maximized. It should be appreciated, however, that in other embodiments, the aft fan 200 may include any other suitable structural configuration, and accordingly may not include one or more of the structural members 208 or outlet guide vanes 222.

Aft of the plurality of fan blades 210, and for the embodiment depicted, aft of the one or more outlet guide vanes 222, the aft fan 200 additionally defines a nozzle 226 between the nacelle 206 and the tail cone 224. The nozzle 226 may be configured to generate an amount of thrust from the air flowing therethrough, and the tail cone 224 may be shaped to minimize an amount of drag on the aft fan 200. However, in other embodiments, the tail cone 224 may have any other shape and may, e.g., end forward of an aft end 230 of the nacelle 206 such that the tail cone 224 is enclosed by the nacelle 206 at an aft end of the tail cone 224. Additionally, in other embodiments, the aft fan 200 may not be configured to generate any measurable amount of thrust, and instead may be configured to ingest air forming a boundary layer of air of the fuselage 12 of the aircraft 10 and add energy/speed up such air to reduce an overall drag on the aircraft 10 (and thus increase a net thrust of the aircraft 10). Notably, the outer nacelle 206 additionally defines an exhaust 228 at the aft end 230 of the outer nacelle 206 with the tail cone 224/cowling of the aft fan 200.

It should be appreciated, however, that the exemplary aft fan 200 is provided by way of example only. In other exemplary embodiments, the aft fan 200 may have any other suitable configuration. For example, in other exemplary embodiments, the aft fan 200 may be mounted to the fuselage 12 using any suitable mounting structure, and further may include any suitable structural support configuration within the aft fan 200.

As is also depicted in FIG. 3, the aircraft 10 includes a stabilizer 232 extending away from the fuselage 12 proximate the aft end 18 of the fuselage 12. For the exemplary embodiment depicted, the stabilizer 232 is a vertical stabilizer 30 attached to the fuselage 12 proximate the aft end 18 of the fuselage 12 (see also FIGS. 1 and 2). The stabilizer 232 includes at least a portion positioned upstream from the plurality of fan blades 210. Specifically, the exemplary stabilizer 232 depicted includes an inner portion 234 extending between the fuselage 12 of the aircraft 10 and the outer nacelle 206 of the aft fan 200. The stabilizer 232, or rather the inner portion 234 of the stabilizer 232, includes an aft end 236, with the aft end 236 positioned at least partially downstream of the inlet 220 defined by the outer nacelle 206 and upstream of the plurality of fan blades 210.

During operation of the aircraft 10, inclusion of the stabilizer 232 having the inner portion 234 positioned upstream of the plurality of fan blades 210 of the aft fan 200 may generate a wake, such that an airflow 235 ingested by the aft fan 200 defines uneven velocity profile along the circumferential direction C of the aft fan 200. In order to reduce the wake of the aft fan 200, the aircraft 10 of the present disclosure includes an airflow duct 238 extending between an inlet 240 and an outlet 242. The inlet 240 is positioned to receive an airflow from a location outside of the fuselage 12 of the aircraft 10 and the outlet 242 is positioned to exhaust the airflow to at least partially offset the wake generated by the stabilizer 232 during operation of the aircraft 10. More specifically, the outlet 242 of the airflow duct 238 is positioned to exhaust the airflow from the airflow duct 238 to at least partially offset the wake upstream of the plurality of fan blades 210 generated by the stabilizer 232.

Figure 4:
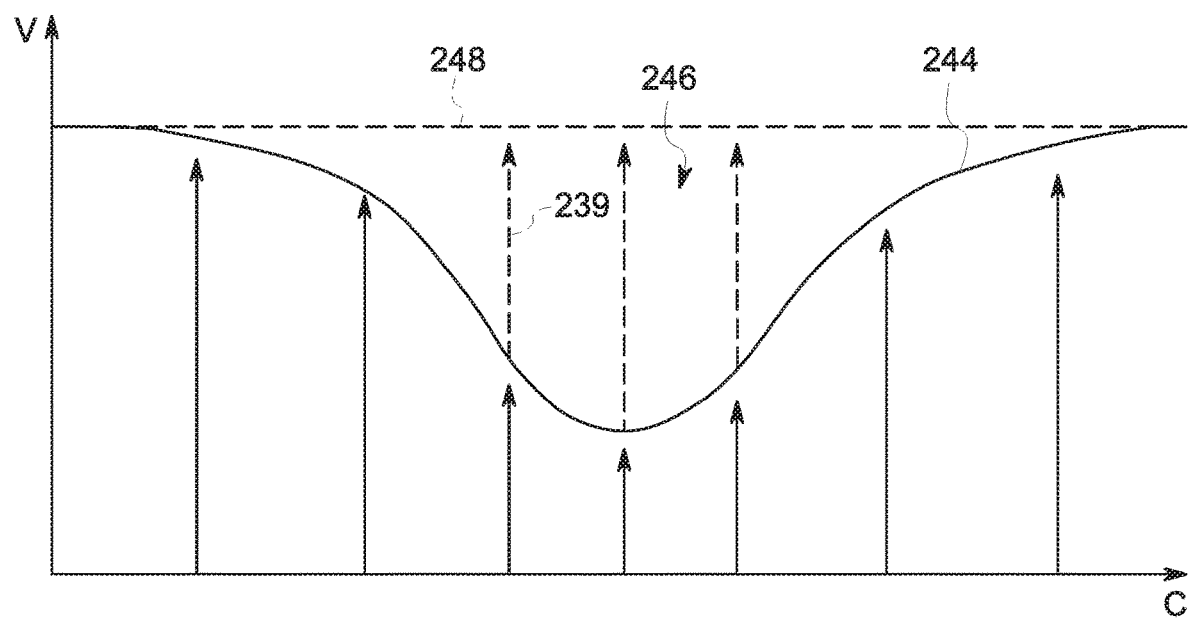
FIG. 4 is a chart depicting a velocity profile of an airflow ingested by the exemplary aft engine of FIG. 3.

Referring briefly to FIG. 4, a chart is provided depicting a velocity of the airflow ingested by the aft fan 200 during operation of the aircraft 10. Specifically, the chart depicts a velocity of the airflow (Y-axis) along the circumferential direction C of the aft fan 200 (X-axis). The line 244 depicts a baseline velocity profile of the airflow 235, showing a wake 246 generated by the stabilizer 232 during operation of the aircraft 10. However, as is also depicted, inclusion of an airflow duct 238 in accordance with one or more exemplary embodiments of the present disclosure at least partially offsets the wake 246 by introducing relatively high velocity airflow 239, e.g., to the wake region 246. More specifically, as discussed in greater detail below, the airflow 239 introduced at least partially offsets the wake 246 generated by the stabilizer 232 upstream of the plurality of fan blades 210, such that a resulting velocity profile 248 is substantially constant along the circumferential direction C.

Referring again to FIG. 3, for the exemplary embodiment depicted, the inlet 240 of the airflow duct 238 is defined by the fuselage 12 of the aircraft 10. More particularly, the fuselage 12 defines a bottom half 250 and a top half 252, and the inlet 240 of the airflow duct 238 is defined by the fuselage 12 of the aircraft 10 at the bottom half 250 of the fuselage 12, upstream of the aft fan 200. Notably, inclusion of an inlet 240 positioned on the bottom half 250 of the fuselage 12 may further assist with an efficiency of the aft fan 200 by drawing the boundary layer airflow closer to the fuselage 12, such that the aft fan 200 may energize a greater amount of boundary layer airflow.

As is depicted, the airflow duct 238 extends through at least a portion of the fuselage 12 and through at least a portion of the stabilizer 232 of the aircraft 10 to the outlet 242. For the embodiment depicted, the outlet 242 is defined by the stabilizer 232 at an aft end of the stabilizer 232, or more particularly, is defined by the stabilizer 232 at the aft end 236 of the inner portion 234 of the stabilizer 232. Accordingly, the exemplary airflow duct 238 may provide relatively high velocity airflow from the airflow duct 238 to the wake generated by the stabilizer 232 to offset the wake generated by the stabilizer 232. It should be appreciated, that as used herein, the "aft end" of the inner portion 234 of the stabilizer 232 may refer to an aft-most 20% of the inner portion 234 of the stabilizer 232.

Notably, for the embodiment depicted, the airflow duct 238 is configured as part of an airflow system configured to offset the wake generated by the stabilizer 232 during operation of the aircraft 10. More specifically, for the embodiment depicted, the airflow system further includes a fan 254 for increasing a velocity of the airflow through the airflow duct 238, a valve 256 for controlling an amount of airflow through the airflow duct 238, and one or more sensors. For the embodiment depicted, the fan 254 is an electric fan positioned within the airflow duct 238 and the valve 256 is a variable throughput valve. Additionally, for the embodiment depicted, the one or more sensors include an airflow duct sensor 258 positioned in or adjacent to the airflow duct 238 for determining one or more of a pressure or velocity of the airflow through the airflow duct 238. Notably, the aircraft 10 further includes additional sensors for measuring parameters of the aircraft 10, which may also be used to control the airflow system. For example, the aircraft 10 includes a sensor 260 for measuring at least one of a pressure or velocity of an airflow immediately downstream of the stabilizer 232 and upstream of the plurality of fan blades 210.

Further, for the embodiment depicted, the airflow system additionally includes a controller 262, which may in certain exemplary embodiments be configured as part of a main aircraft controller, operably connected to the fan 254, the valve 256, and the sensors 258, 260 through one or more wired or wireless communication buses. The controller 262 may be configured to operate the fan and/or valve 256 at least in part in response to the pressures and/or velocities measured by the sensors 258, 260.

The controller 262 may be any suitable controller. For example, the controller 262 may include one or more computing devices having one or more processors and one or more memory devices for storing information accessible to the one or more processors. The controller may further include a communication interface operably connected to one or more wired or wireless communication buses allowing the controller 262 to communicate with various other components of the aircraft 10.

It should be appreciated, however, that the exemplary embodiment depicted in FIG. 3 is provided by way of example only. In other exemplary embodiments, the aircraft 10, and airflow duct 238, may instead be configured in any other suitable manner. For example, referring now to FIG. 5, a close-up, side, schematic view of an aircraft 10 in accordance with another exemplary embodiment of the present disclosure is provided. The exemplary aircraft 10 of FIG. 5 may be configured in substantially the same manner as exemplary aircraft 10 of FIG. 3, and accordingly, the same numbers refer to the same or similar part. For example, the exemplary aircraft 10 of FIG. 5 includes a fuselage 12 with an aft fan 200 mounted to the fuselage 12 at an aft end 18 the fuselage 12. The aft fan 200 includes a plurality of fan blades 210 rotatable through a fan shaft 216 by a power source 218. The aft fan 200 additionally includes an outer nacelle 206 enclosing the plurality fan blades 210. A stabilizer 232 of the aircraft 10 is attached to the fuselage 12 and extends away from the fuselage 12 proximate the aft end 18 of the fuselage 12. The stabilizer 232 includes an inner portion 234 extending between the fuselage 12 and the outer nacelle 206 of the aft fan 200. The inner portion 234 includes an aft end 236 positioned upstream of the plurality of fan blades 210 and, for the embodiment depicted, downstream of the inlet 220.

Additionally, the aircraft 10 includes an airflow duct 238 extending between an inlet 240 and an outlet 242, with the inlet 240 positioned to receive an airflow from a location outside the fuselage 12 and the outlet 242 position to exhaust the airflow to at least partially offset a wake upstream of the plurality fan blades 210 generated by the stabilizer 232. However, for the embodiment depicted, the inlet 240 of the airflow duct 238 includes a plurality of inlets 240 defined by the fuselage 12 of the aircraft 10 at a bottom half 250 of the fuselage 12 of the aircraft 10. Additionally, for the embodiment depicted, the outlet 242 of the airflow duct 238 includes a plurality of outlets 242. The plurality of outlets 242 are arranged along an aft end of the stabilizer 232, or more particularly, along the aft end 236 of the inner portion 234 of the stabilizer 232. More particularly, still, for the embodiment depicted, the plurality of outlets 242 are arranged along the aft end 236 of the inner portion 234 of the stabilizer 232 along the radial direction R of the aft fan 200. The plurality of outlets 242 may be arranged linearly, or in a zig-zag pattern, or in any other suitable pattern. Additionally, each of the plurality of outlets 242 may be substantially evenly spaced and substantially the same size, or alternatively, may vary in spacing and/or size in order to more effectively offset the wake generated by the stabilizer 232. Moreover, it should be appreciated that in other exemplary embodiments, the inlets 240 may include any suitable number of inlets 240, and similarly, the outlets 242 may include any suitable number of outlets 242.

For the embodiment depicted, the plurality of inlets 240 converge to a single body portion 264 of the airflow duct 238 prior to subsequently splitting off to the individual outlets 242. However, in other embodiments, the airflow duct 238 may include a plurality of airflow ducts 238 extending from a respective inlets 240 to respective outlets 242. Each of the respective inlets 240 may be defined by the fuselage 12 of the aircraft 10 at a bottom half 250 of the fuselage 12, or alternatively, may be defined in any other suitable location.

Moreover, it should be appreciated, that in still other embodiments, each of the one or more inlets 240 and/or outlets 242 of the airflow duct 238($s$) may be defined at any other suitable location to allow the airflow duct 238 to at least partially offset the wake generated by the stabilizer 232 during operation of the aircraft 10.

Figure 6:
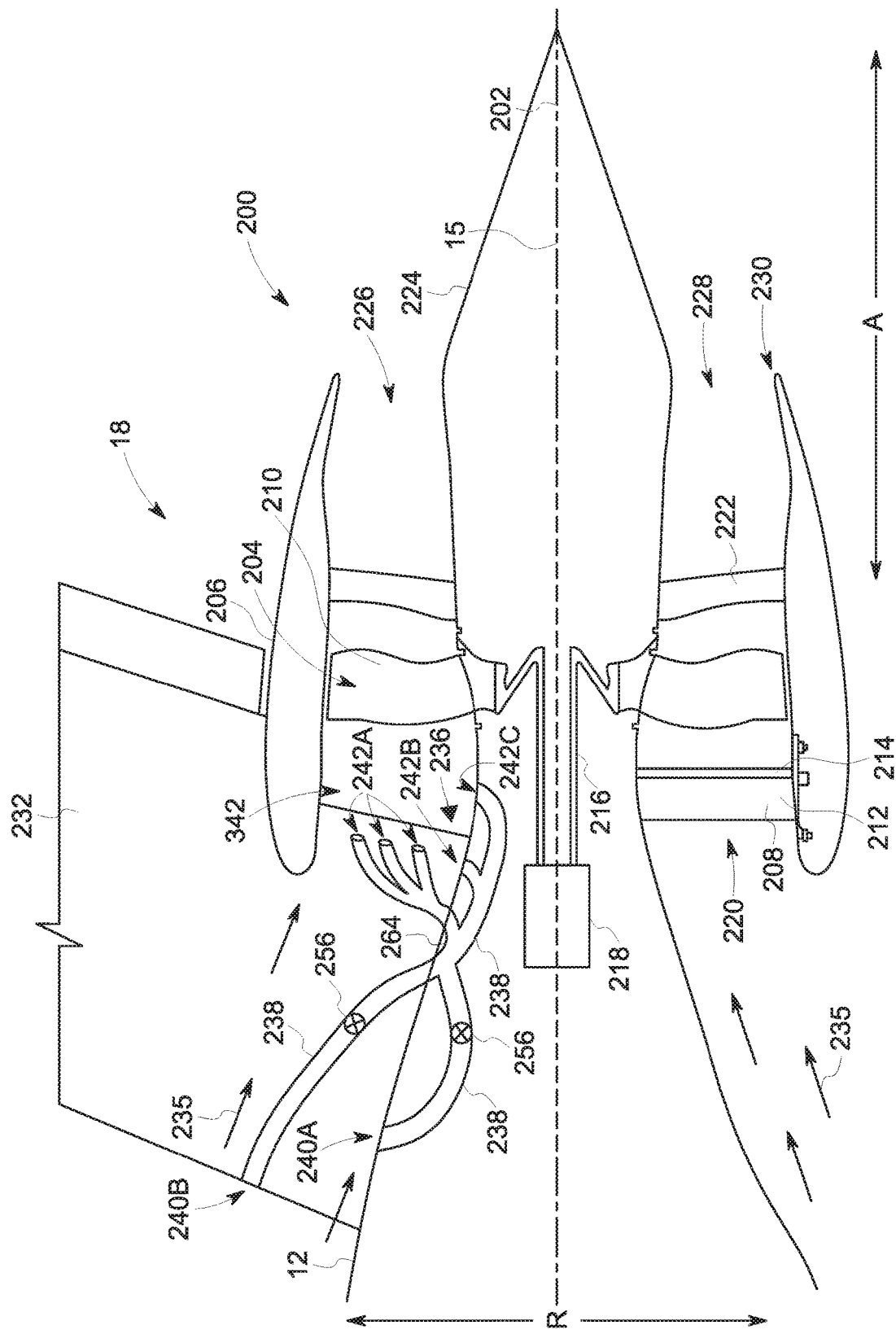
FIG. 6 is a schematic, cross-sectional view of an aft engine in accordance with yet another exemplary embodiment of the present disclosure.

For example, referring now to FIG. 6, a close-up, side, schematic view of an aircraft 10 in accordance with another exemplary embodiment of the present disclosure is provided. The exemplary aircraft 10 of FIG. 6 may be configured in substantially the same manner as exemplary aircraft 10 of FIG. 3, and accordingly, the same numbers refer to the same or similar part. For example, the exemplary aircraft 10 of FIG. 6 includes a fuselage 12 with an aft fan 200 mounted to the fuselage 12 at an aft and the fuselage 12. The aft fan 200 includes a plurality of fan blades 210 rotatable through a fan shaft 216 by a power source 218. The aft fan 200 additionally includes an outer nacelle 206 enclosing the plurality fan blades 210. A stabilizer 232 of the aircraft 10 is attached to the fuselage 12 and extends away from the fuselage 12 proximate the aft end 18 of the fuselage 12. The stabilizer 232 includes an inner portion 234 extending between the fuselage 12 and the outer nacelle 206 of the aft fan 200. The inner portion 234 includes an aft end 236 positioned upstream of the plurality of fan blades 210 and, for the embodiment depicted, downstream of the inlet 220.

Additionally, the aircraft 10 includes an airflow duct 238 extending between an inlet 240 and an outlet 242, with the inlet 240 positioned to receive an airflow from a location outside the fuselage 12 and the outlet 242 position to exhaust the airflow to at least partially offset a wake upstream of the plurality fan blades 210 generated by the stabilizer 232. However, for the embodiment depicted, the inlet 240 includes a plurality of inlets 240 positioned remotely from one another and the outlet 242 includes a plurality of outlets 242 also located remotely from one another (i.e., on/in different components or at different sections of the same component).

Specifically, for the embodiment depicted, the airflow duct 238 includes a first inlet 240A defined by the fuselage 12 of the aircraft 10 at a top half 252 of the fuselage 12 and a second inlet 240B defined by the stabilizer 232 of the aircraft 10 at a leading edge/forward end 266 of the stabilizer 232. Additionally, the plurality of outlets 242 includes a plurality of first outlets 242A defined by the stabilizer 232 proximate the aft end 236 of an inner portion 234 of the stabilizer 232 extending between the fuselage 12 and the outer nacelle 206, as well as a second outlet 242B and a third outlet 242C. For the embodiment depicted, the plurality of first outlets 242A are defined by the stabilizer 232 upstream of the aft end 236 of the inner portion 234, and arranged generally along the radial direction R. Additionally, for the embodiment depicted, the second outlet 242B is similarly positioned forward of the aft end 236 of the inner portion 234 of the stabilizer 232, but defined by the fuselage 12 at the top side 252 of the fuselage 12. By contrast, the third outlet 242C is positioned aft of the aft end 236 of the inner portion 234 of stabilizer 232, also defined by the fuselage 12 of the top side 252 of the fuselage 12.

As is also depicted, the airflow duct 238 includes a plurality of valves 256, such as a variable throughput valves, to, e.g., allow for control of the airflow provided through the airflow duct 238 to the various outlets 242. It should be appreciated, however, that in other embodiments, the airflow duct 238 may not include the valves 256, or alternatively, may include valves 256 positioned at any other suitable location.

Inclusion of an airflow duct in accordance with one or more embodiments the present disclosure may assist with providing the aft fan with an airflow defining a more consistent velocity profile. Providing the aft fan with an airflow defining a consistent velocity profile may reduce an amount of wear one aft fan, resulting in less maintenance and repair being necessary for the aft fan.

Figure 7:
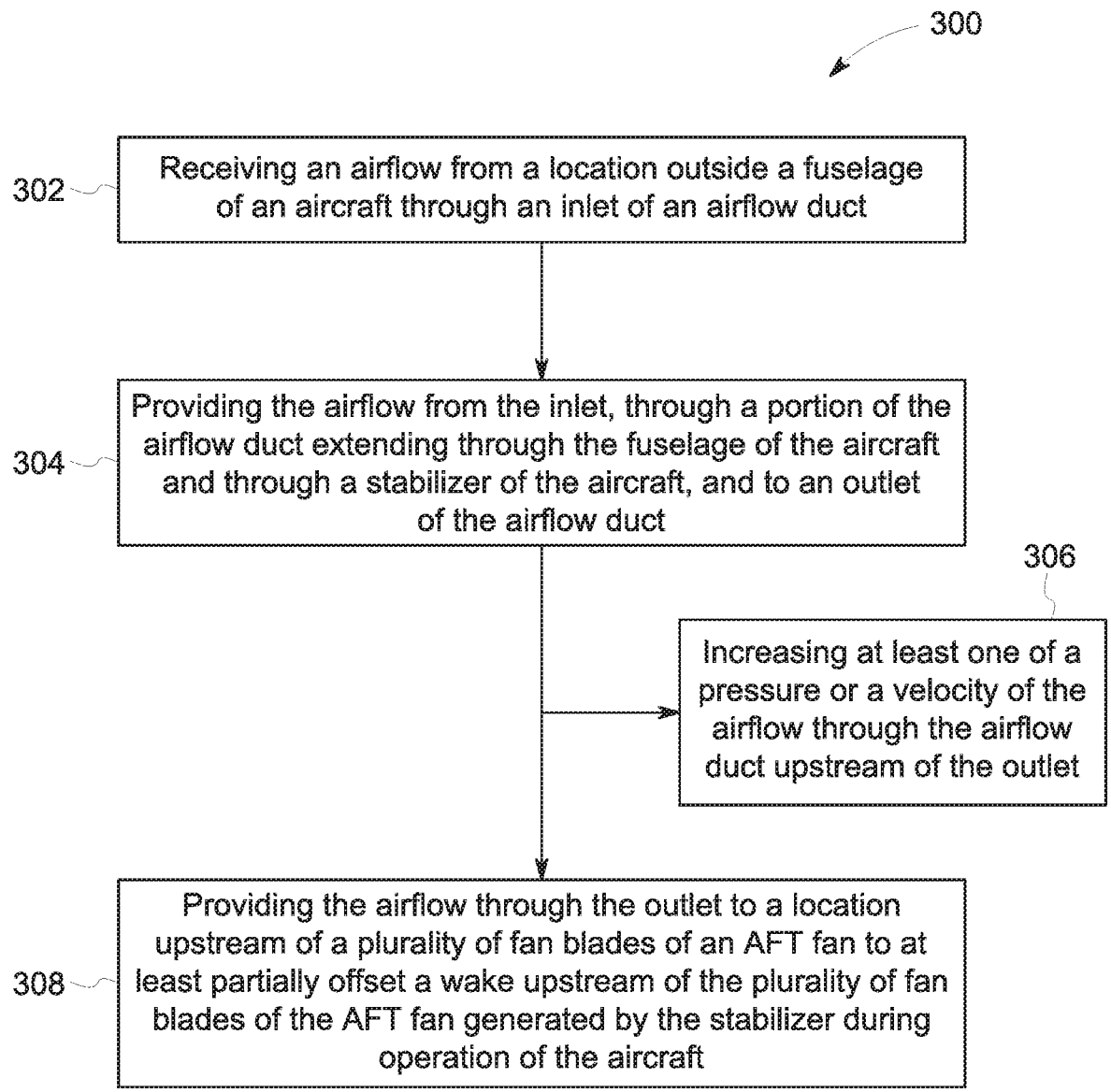
FIG. 7 is a flowchart of a method for operating an aft fan in accordance with an exemplary aspect of the present disclosure.

Referring now to FIG. 7, a method (300) for operating a propulsor of an aircraft in accordance with an exemplary aspect of the present disclosure is provided. In certain exemplary aspects, the exemplary method (300) may be utilized with one or more the exemplary embodiments described above with reference to FIGS. 1 through 6. Accordingly, in certain exemplary aspects, the propulsor may be an aft fan including a plurality of fan blades, and the aircraft may include a fuselage defining an aft end, a stabilizer positioned proximate the aft end of the fuselage, and an airflow duct extending between an inlet and an outlet.

As is depicted, the exemplary method (300) includes at (302) receiving airflow from a location outside the fuselage of the aircraft through the inlet of the airflow duct. In certain exemplary aspects, the inlet may be defined by the fuselage of the aircraft, such as at a bottom half of the fuselage. Accordingly, with such an exemplary aspect, receiving the airflow at (302) may include receiving the airflow from a location outside the bottom half of the fuselage from a boundary layer airflow over the bottom half of the fuselage.

The exemplary method (300) additionally includes at (304) providing the airflow received through the inlet of the airflow duct at (302) through a portion of the airflow duct extending at least partially through the fuselage of the aircraft and at least partially through the stabilizer of the aircraft, and to the outlet of the airflow duct. Moreover, the exemplary method (300) optionally includes at (306) increasing at least one of a pressure or a velocity of the airflow through the airflow duct upstream of the outlet. For example, in certain exemplary aspects, the exemplary method (300) may include at (306) increasing at least one of a pressure or a velocity of the airflow through the airflow duct using a fan positioned within the airflow duct.

Referring still to FIG. 7 the exemplary method (300) includes at (308) providing the airflow received through the inlet of the airflow duct at (302) through the outlet to a location upstream of the plurality of fan blades of the aft fan to at least partially offset a wake generated upstream of the plurality of fan blades of the aft fan by the stabilizer during operation of the aircraft. In certain exemplary aspects, the stabilizer defines an aft end position upstream of the plurality of fan blades. With such an exemplary aspect, providing the airflow through the outlet at (308) may include providing the airflow through the outlet positioned at the aft end of the stabilizer. Additionally, or alternatively, the outlet of the airflow duct may include a plurality of outlets and providing the airflow through the outlet at (308) may include providing the airflow through the plurality of outlets positioned along the aft end of the stabilizer.

Operating an aft fan of an aircraft in accordance with one or more exemplary aspects of the present disclosure may allow for reducing or eliminating a wake generated by a stabilizer of the aircraft, such that an airflow ingested by the aft fan defines a more consistent velocity profile along a circumferential direction of the aft fan. More specifically, reducing or eliminating a wake generated by a stabilizer of the aircraft may provide for a reduction in fan blade material fatigue during operation, in addition to resulting in a less noisy and possibly more efficient aft fan.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft comprising:
   a propulsor comprising a plurality of fan blades;
   a fuselage extending between a forward end and an aft end, the propulsor attached to the fuselage at the aft end of the fuselage;
   a stabilizer extending away from the fuselage proximate the aft end of the fuselage, the stabilizer including at least a portion positioned upstream from the plurality of fan blades; and
   an airflow duct extending between an inlet and an outlet, the inlet positioned to receive an airflow from a location outside the fuselage of the aircraft, the outlet positioned to exhaust the airflow to at least partially offset a wake upstream of the plurality of fan blades of the propulsor, the wake generated by the stabilizer during operation of the aircraft,
   wherein the stabilizer defines an aft end, wherein the outlet of the airflow duct comprises a plurality of outlets, and wherein the plurality of outlets is arranged along the aft end of the stabilizer.

2. The aircraft of claim 1, wherein the inlet of the airflow duct is defined by the fuselage of the aircraft.

3. The aircraft of claim 1, wherein the inlet of the airflow duct is defined by the fuselage of the aircraft at a bottom half of the fuselage.

4. The aircraft of claim 1, wherein the stabilizer is a vertical stabilizer attached to the fuselage.

5. An aircraft comprising:
   a propulsor comprising a plurality of fan blades;
   a fuselage extending between a forward end and an aft end, the propulsor attached to the fuselage at the aft end of the fuselage;
   a stabilizer extending away from the fuselage proximate the aft end of the fuselage, the stabilizer including at least a portion positioned upstream from the plurality of fan blades; and
   an airflow duct extending between an inlet and an outlet, the inlet positioned to receive an airflow from a location outside the fuselage of the aircraft, the outlet positioned to exhaust the airflow to at least partially offset a wake upstream of the plurality of fan blades of the propulsor, the wake generated by the stabilizer during operation of the aircraft, wherein the stabilizer defines an aft end, and wherein the outlet of the airflow duct is defined in the stabilizer at the aft end of the stabilizer.

6. The aircraft of claim 1, wherein the propulsor comprises an outer nacelle enclosing the plurality of fan blades, wherein a portion of the stabilizer extends between the fuselage and the outer nacelle upstream of the plurality of fan blades.

7. An aircraft comprising:
a propulsor comprising a plurality of fan blades;
a fuselage extending between a forward end and an aft end, the propulsor attached to the fuselage at the aft end of the fuselage;
a stabilizer extending away from the fuselage proximate the aft end of the fuselage, the stabilizer including at least a portion positioned upstream from the plurality of fan blades; and
an airflow duct extending between an inlet and an outlet, the inlet positioned to receive an airflow from a location outside the fuselage of the aircraft, the outlet positioned to exhaust the airflow to at least partially offset a wake upstream of the plurality of fan blades of the propulsor, the wake generated by the stabilizer during operation of the aircraft, wherein the stabilizer defines an aft end, and wherein the outlet of the airflow duct is defined in the stabilizer upstream of the aft end.

8. The aircraft of claim 1, wherein the airflow duct extends through at least a portion of the fuselage of the aircraft and through at least a portion of the stabilizer of the aircraft.

9. The aircraft of claim 1, wherein the propulsor is a fan defining an axial centerline and comprising an outer nacelle, wherein the outer nacelle extends substantially three hundred and sixty degrees (360°) around the axial centerline.

10. The aircraft of claim 9, wherein the fan is an electric fan configured to ingest a boundary layer airflow over the fuselage of the aircraft.

11. The aircraft of claim 1, wherein the airflow duct comprises a fan for increasing a velocity of the airflow through the airflow duct.

12. A method for operating a propulsor of an aircraft having a plurality of fan blades, the aircraft comprising a fuselage defining an aft end, a stabilizer positioned proximate the aft end of the fuselage, and an airflow duct extending between an inlet and an outlet, the method comprising:
receiving an airflow from a location outside the fuselage of the aircraft through the inlet of the airflow duct; and
providing the airflow received through the inlet of the airflow duct through the outlet of the airflow duct to a location upstream of the plurality of fan blades of the propulsor to at least partially offset a wake generated upstream of the plurality of fan blades of the propulsor by the stabilizer during operation of the aircraft,
wherein the stabilizer defines an aft end positioned upstream of the plurality of fan blades, and wherein providing the airflow through the outlet of the airflow duct comprises providing the airflow through a plurality of outlets of the airflow duct positioned along the aft end of the stabilizer.

13. A method for operating a propulsor of an aircraft having a plurality of fan blades, the aircraft comprising a fuselage defining an aft end, a stabilizer positioned proximate the aft end of the fuselage, and an airflow duct extending between an inlet and an outlet, the method comprising:
receiving an airflow from a location outside the fuselage of the aircraft through the inlet of the airflow duct and
providing the airflow received through the inlet of the airflow duct through the outlet of the airflow duct to a location upstream of the plurality of fan blades of the propulsor to at least partially offset a wake generated upstream of the plurality of fan blades of the propulsor by the stabilizer during operation of the aircraft, wherein the stabilizer defines an aft end positioned upstream of the plurality of fan blades, and wherein providing the airflow through the outlet of the airflow duct comprises providing the airflow through the outlet of the airflow duct positioned at the aft end of the stabilizer.

14. The method of claim 12, wherein the inlet of the airflow duct is defined by the fuselage of the aircraft.

15. The method of claim 12, wherein the inlet of the airflow duct is defined by the fuselage of the aircraft at a bottom half of the fuselage.

16. The method of claim 12, wherein the stabilizer is a vertical stabilizer attached to the fuselage.

17. The method of claim 12, further comprising:
increasing at least one of a pressure or a velocity of the airflow through the airflow duct upstream of the outlet.

18. The method of claim 12, further comprising:
providing the airflow from the inlet, through a portion of the airflow duct extending through the fuselage of the aircraft and through the stabilizer of the aircraft, and to the outlet.

* * * * *